United States Patent
Baek et al.

(10) Patent No.: US 9,306,748 B2
(45) Date of Patent: Apr. 5, 2016

(54) AUTHENTICATION METHOD AND APPARATUS IN A COMMUNICATION SYSTEM

(75) Inventors: Young-Kyo Baek, Seoul (KR); Alper Yegin, Istanbul (TR); Ji-Cheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 13/367,615

(22) Filed: Feb. 7, 2012

(65) Prior Publication Data

US 2012/0204027 A1 Aug. 9, 2012

(30) Foreign Application Priority Data

Feb. 9, 2011 (KR) .................. 10-2011-0011522

(51) Int. Cl.
| | |
|---|---|
| H04L 9/08 | (2006.01) |
| H04L 9/32 | (2006.01) |
| H04L 29/06 | (2006.01) |
| H04W 12/06 | (2009.01) |
| H04W 12/10 | (2009.01) |
| G06F 15/16 | (2006.01) |

(52) U.S. Cl.
CPC ............ *H04L 9/321* (2013.01); *H04L 63/0876* (2013.01); *H04L 63/126* (2013.01); *H04W 12/06* (2013.01); *H04W 12/10* (2013.01); *H04L 63/162* (2013.01)

(58) Field of Classification Search
CPC ... H04L 63/08; H04L 63/062; H04L 63/0786; H04L 63/126; H04L 9/083; H04L 63/06; H04L 63/0869; H04L 9/0822; H04L 63/0442; H04L 63/20; H04L 63/0892; H04L 9/0819; H04L 9/0866; H04L 9/321; H04W 12/06; H04W 12/04

USPC .................................. 713/115, 150, 168–170
See application file for complete search history.

(56) References Cited

U.S. PATENT DOCUMENTS

| 7,716,483 | B2 * | 5/2010 | Sozzani et al. ................. 713/171 |
| 2003/0026433 | A1 * | 2/2003 | Matt .............................. 380/278 |
| 2004/0030891 | A1 * | 2/2004 | Kurihara ....................... 713/168 |
| 2004/0133806 | A1 * | 7/2004 | Joong et al. ................... 713/201 |
| 2005/0125670 | A1 * | 6/2005 | Sozzani et al. ................. 713/171 |
| 2006/0251257 | A1 * | 11/2006 | Haverinen et al. ............. 380/270 |
| 2007/0180247 | A1 * | 8/2007 | Leech ........................... 713/171 |
| 2008/0282325 | A1 * | 11/2008 | Oyama et al. .................... 726/4 |
| 2009/0063851 | A1 * | 3/2009 | Nijdam ......................... 713/155 |

(Continued)

OTHER PUBLICATIONS

RFC 3748, "Extensible Authentication Protocol (EAP)," IETF, Jun. 2004, 63 pages.*

*Primary Examiner* — Michael Simitoski
(74) *Attorney, Agent, or Firm* — Jefferson IP Law, LLP

(57) ABSTRACT

An authentication method and apparatus in a communication system are provided. In a method for authenticating a first node at a second authentication server in a communication system comprising the first node registered to a first authentication server and a second node registered to the second authentication server, an authentication request message requesting authentication of the first node is received from the second node, the authentication request message is transmitted to the first authentication server, and upon receipt of an authentication success message indicating successful authentication of the first node from the first authentication server, the authentication success message is transmitted to the second node.

8 Claims, 10 Drawing Sheets

(56) References Cited

U.S. PATENT DOCUMENTS

| | | | |
|---|---|---|---|
| 2009/0068985 A1* | 3/2009 | Nguyen et al. | 455/411 |
| 2009/0100261 A1* | 4/2009 | Aoshima | 713/155 |
| 2009/0119742 A1* | 5/2009 | Graziani et al. | 726/1 |
| 2009/0138955 A1* | 5/2009 | Vinayakray-Jani | 726/12 |
| 2009/0287922 A1* | 11/2009 | Herwono et al. | 713/155 |
| 2011/0206206 A1* | 8/2011 | Blom et al. | 380/279 |
| 2011/0214174 A1* | 9/2011 | Herzog et al. | 726/10 |

* cited by examiner

AUTHENTICATION METHOD AND APPARATUS IN A COMMUNICATION SYSTEM

PRIORITY

This application claims the benefit under 35 U.S.C. §119 (a) of a Korean patent application filed in the Korean Intellectual Property Office on Feb. 9, 2011 and assigned Serial No. 10-2011-0011522, the entire disclosure of which is hereby incorporated by reference.

BACKGROUND OF THE INVENTION

1. Field of the Invention

The present invention relates to an authentication method and apparatus in a communication system. More particularly, the present invention relates an authentication method and apparatus for ensuring security in information transmission and reception between nodes.

2. Description of the Related Art

For a user to receive a network service in a communication system, a service provider typically performs an authentication procedure to determine whether the user subscribed to the network service and to authorize the user to access the network service if the user is determined to have subscribed to the network service. The authentication procedure may be performed based on, for example, the Extensible Authentication Protocol (EAP).

The EAP is an authentication framework that supports multiple authentication schemes in wired and wireless networks. EAP methods include EAP-Message Digest 5 (EAP-MD5), EAP-Transport Layer Security (EAP TLS), Protected EAP (PEAP), EAP for GSM Subscriber Identity Module (EAP-SIM), and EAP for Universal Mobile Telecommunications System (UMTS) Authentication and Key Agreement (EAP-AKA) according to authentication mechanisms. These EAP methods are used in Ethernet, Wireless Local Area Network (WLAN) (Institute of Electrical and Electronics Engineers (IEEE) 802. 11), and Worldwide Interoperability for MicroWave Access (WiMAX) (IEEE 802.16).

Meanwhile, various nodes such as smart phones and Internet Protocol (IP) TVs that are equipped with IP-based communication or wireless communication functions have been recently emerged. Such nodes can exchange information through the Internet or by wireless communication.

However, there is no specified method for performing authentication between such nodes. As a result, security problems occur during information transmission and reception between the nodes.

Therefore, a need exists for an authentication method for ensuring security in information transmission and reception between nodes.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an authentication method and apparatus in a communication system.

Another aspect of the present invention is to provide a method and apparatus for enabling authentication between nodes in a communication system.

In accordance with an aspect of the present invention, a method for authenticating a first node at a second authentication server in a communication system comprising the first node registered to a first authentication server and a second node registered to the second authentication server is provided. As part of the method an authentication request message requesting authentication of the first node is received from the second node, the authentication request message is transmitted to the first authentication server, and upon receipt of an authentication success message indicating successful authentication of the first node from the first authentication server, the authentication success message is transmitted to the second node. The authentication request message comprises an Identifier (ID) of the first node, an ID of the second node, and a first authentication code, and the authentication success message comprises a Hash value of the ID of the second node, a security key used for encrypted communication between the first node and the second node, and a second authentication code.

In accordance with another aspect of the present invention, a method for performing encrypted communication with a first node at a second node in a communication system comprising the first node registered to a first authentication server and the second node registered to a second authentication server is provided. As part of the method an authentication request message requesting authentication of the first node is transmitted to the second authentication server, and upon receipt of an authentication success message indicating successful authentication of the first node from the second authentication server, the encrypted communication is performed with the first node. The authentication request message comprises an ID of the first node, an ID of the second node, and a first authentication code and the authentication success message comprises a Hash value of the ID of the second node, a security key used for the encrypted communication, and a second authentication code.

In accordance with another aspect of the present invention, a method for authenticating a first node at a first authentication server in a communication system comprising the first node registered to the first authentication server and a second node registered to a second authentication server is provided. As part of the method an authentication request message requesting authentication of the first node is received from the second authentication server, the first node is authenticated using an ID of the first node comprised in the authentication request message, a security key is generated for use in encrypted communication between the first node and the second node and a Hash value of an ID of the second node is generated, if the authentication of the first node is successful, and an authentication success message indicating successful authentication of the first node is transmitted to the second authentication server. The authentication request message comprises the ID of the first node, the ID of the second node, and a first authentication code and the authentication success message comprises the Hash value of the ID of the second node, the security key, and a second authentication code.

In accordance with another aspect of the present invention, a method for performing encrypted communication with a second node at a first node in a communication system comprising the first node registered to a first authentication server and the second node registered to a second authentication server. is provided. As part of the method upon receipt of a request identity message comprising an ID of the second node from the second node, a response identity message comprising an ID of the first node is transmitted to the second node, an authentication procedure is performed with the first authentication server using the ID of the first node, a Hash value of the ID of the second node is determined using the ID of the second node, upon receipt of an authentication success message indicating successful authentication of the first node and a connection request message comprising a Hash value of the ID of the second node from the second node, and if the determined Hash value is equal to the Hash value comprised in the connection request message, a connection response message indicating that encrypted communication is possible is transmitted to the second node and the encrypted communication is performed with the second node.

In accordance with another aspect of the present invention, a second authentication server for authenticating a first node in a communication system comprising the first node registered to a first authentication server and a second node registered to the second authentication server is provided. As part of the second authentication server a receiver receives an authentication request message requesting authentication of the first node from the second node and receives an authentication success message indicating successful authentication of the first node from the first authentication server, a transmitter transmits the authentication request message to the first authentication server, and transmits the authentication success message to the second node, and a controller controls the transmitter to transmit the authentication request message to the first authentication server, upon receipt of the authentication request message, and to transmit the authentication success message to the second node, upon receipt of the authentication success message. The authentication request message comprises an ID of the first node, an ID of the second node, and a first authentication code, and the authentication success message comprises a Hash value of the ID of the second node, a security key used for encrypted communication between the first node and the second node, and a second authentication code.

In accordance with another aspect of the present invention, a second node for performing encrypted communication with a first node in a communication system comprising the first node registered to a first authentication server and the second node registered to a second authentication server is provided. As part of the second node a transmitter transmits an authentication request message requesting authentication of the first node to the second authentication server, a receiver receives an authentication success message indicating successful authentication of the first node from the second authentication server, and a controller controls the transmitter and the receiver and operatively performs encrypted communication with the first node, upon receipt of the authentication success message. The authentication request message comprises an ID of the first node, an ID of the second node, and a first authentication code, and the authentication success message comprises a Hash value of the ID of the second node, a security key used for the encrypted communication, and a second authentication code.

In accordance with another aspect of the present invention, there is provided a first authentication server for authenticating a first node in a communication system comprising the first node registered to the first authentication server and a second node registered to a second authentication server is provided. As part of the first authentication server a receiver receives an authentication request message requesting authentication of the first node from the second authentication server, a transmitter transmits an authentication success message indicating successful authentication of the first node to the second authentication server, and a controller controls the transmitter and the receiver, operatively receives the authentication request message from the second authentication server, authenticates the first node using an ID of the first node comprised in the authentication request message, generates a security key for use in encrypted communication between the first node and the second node and a Hash value of an ID of the second node, if the authentication of the first node is successful, and operatively transmits the authentication success message to the second authentication server. The authentication request message comprises the ID of the first node, the ID of the second node, and a first authentication code and the authentication success message comprises the Hash value of the ID of the second node, the security key, and a second authentication code.

In accordance with a further aspect of the present invention, a first node for performing encrypted communication with a second node in a communication system comprising the first node registered to a first authentication server and the second node registered to a second authentication server is provided. As part of the first node a receiver receives a request identity message including an ID of the second node, an authentication success message indicating successful authentication of the first node, and a connection request message comprising a Hash value of the ID of the second node from the second node, a transmitter transmits a response identity message comprising an ID of the first node and a connection response message indicating that encrypted communication is possible to the second node, and a controller controls the receiver and the transmitter, operatively transmits the response identity message to the second node, upon receipt of the request identity message from the second node, performs an authentication procedure with the first authentication server using the ID of the first node, determines a Hash value of the ID of the second node using the ID of the second node, upon receipt of the authentication success message and the connection request message from the second node, compares the determined Hash value with the Hash value comprised in the connection request message, operatively transmits the connection response message to the second node, if the calculated Hash value is equal to the Hash value comprised in the connection request message, and operatively performs the encrypted communication with the second node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
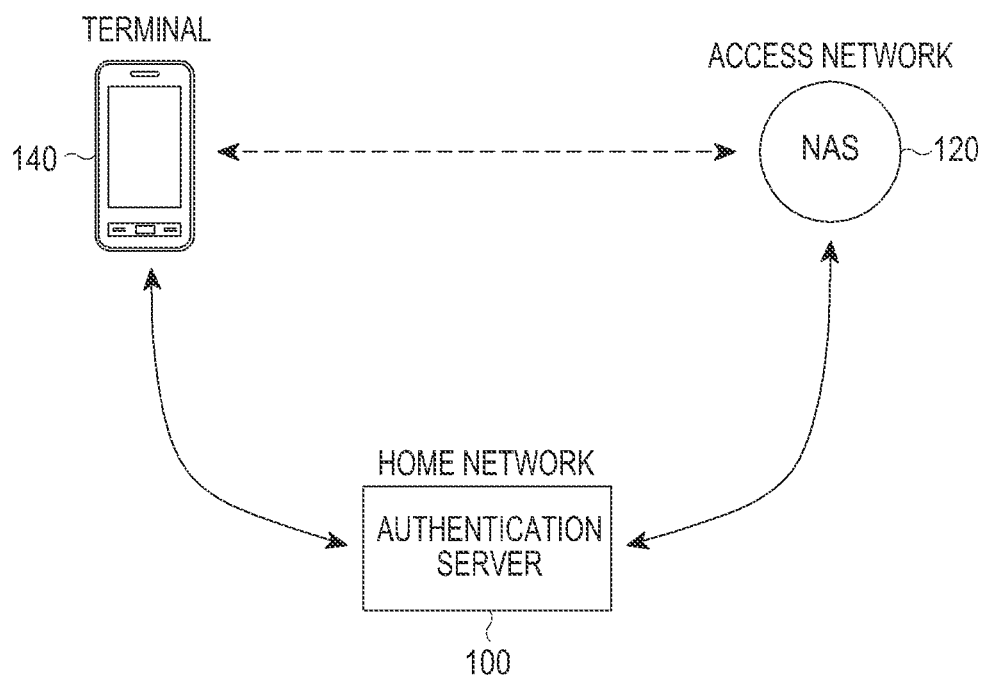
FIG. 1 illustrates a configuration of a related communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an authentication method and apparatus in a communication system. Particularly, exemplary embodiments of the present invention provide a method and apparatus for enabling authentication between nodes in a communication system. In accordance with exemplary embodiments of the present invention, the term "node" covers a broad range of devices including, for example, a terminal, a TV, a vehicle, a scale, a Personal Digital Assistant (PDA), a laptop computer, and/or the like. Nodes may be connected to one another by wireless communication or through the Internet. According to exemplary embodiments of the present invention, nodes may be included in the same or different networks.

According to exemplary embodiments of the present invention, a TV connected to the Internet, and a terminal operatively connected wirelessly to the TV may perform mutual authentication for upload, download, and streaming services between one another. For example, when a TV and a terminal at different locations are connected to each other through the Internet, the TV and the terminal may also perform mutual authentication. In addition, mutual authentication may be performed between a plurality of sensors and a controller that manages and controls the plurality of sensors, for transmission and reception of encrypted data. For example, a scale connected to the Internet and a vehicle connected wirelessly to the scale may perform mutual authentication and thus share information such as information about the weight of the vehicle between one another. Terminals connected to one another through the Internet may transmit and receive confidential materials (e.g., information) after mutual authentication. In this manner, authentication is facilitated between nodes so that the nodes may communicate with each other with security in the exemplary embodiments of the present invention.

Before describing exemplary embodiments of the present invention, an authentication procedure between nodes in a related communication system will first be described.

FIG. 1 illustrates the configuration of a related communication system according to an exemplary embodiment of the present invention.

Referring to FIG. 1, the related communication system includes an authentication server 100, a Network Access Server (NAS) 120, and a terminal 140.

The authentication server 100 is responsible for authentication, authority verification, and accounting for an authorized user. The authentication server 100 may be, for example, an Authentication Authorization Accounting (AAA) server in a home network, an Extensible Authentication Protocol (EAP) authentication server, or the like.

The NAS 120 is a client of the authentication server 100, which may be an AAA client, an EAP authentication device in an access network, or the like. The NAS 120 performs mutual authentication with the authentication server 100 using Remote Access Dial-In User Service (RADIUS) or Diameter. RADIUS is a protocol for carrying information related to authentication to manage network access. The RADIUS provides a standard of information exchange for authentication, authorization, and accounting between the authentication server 100 and the NAS 120. Diameter is a protocol that ensures inter-domain mobility for roaming, security, compatibility with lower-layer protocols, and service extension. The Diameter is an information protection technology of providing a roaming service to wireless Internet and Mobile Internet Protocol (IP) subscribers.

The terminal 140 is a device using the EAP. The terminal 140 performs mutual authentication with the authentication server 100 by an EAP authentication procedure. The terminal 140 accesses a network through the NAS 120 in the following authentication method. The terminal 140 transmits a network access request to the NAS 120 and transmits its authentication information including its Identifier (ID) to the NAS 120. Thereafter, the NAS 120 transmits the received authentication information to the authentication server 100 and the authentication server 100 notifies the terminal 140 through the NAS 120 whether the terminal 140 is authorized to access the network in an authentication procedure. After authentication, the terminal 140 accesses the network through the NAS 120 according to a granted authority.

As described before, the NAS 120 and the terminal 140 each may perform mutual authentication directly with the authentication server 100. However, the NAS 120 and the terminal 140 can perform mutual authentication, only through the authentication server 100, not directly between one another.

Figure 2:
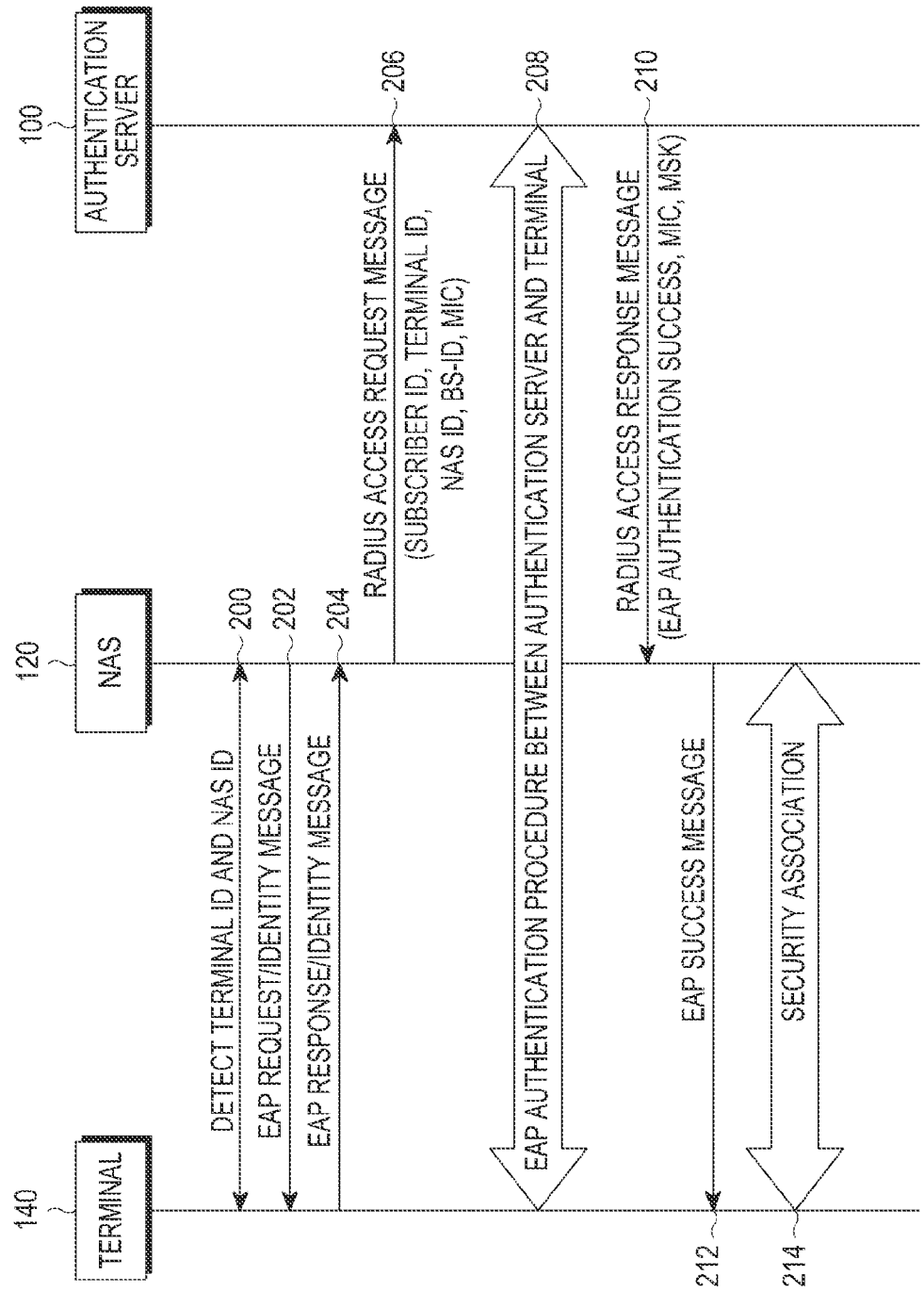
FIG. 2 illustrates a signal flow for an authentication procedure between a Network Access Server (NAS) and a terminal in a related communication system.

With reference to FIG. 2, an authentication procedure between the NAS 120 and the terminal 140 will be described.

FIG. 2 is illustrates a signal flow for an authentication procedure between a NAS and a terminal in a related communication system.

Referring to FIG. 2, each of the NAS 120 and the terminal 140 detects the other's identification (ID) in step 200. That is, the NAS 120 detects an ID of the terminal 140 (hereinafter, referred to as the terminal ID) and the terminal 140 detects an ID of the NAS 120 (hereinafter, referred to as the NAS ID). The terminal ID includes a Medium Access Control (MAC) address of the terminal 140, and the NAS ID includes one of a Service Set Identifier (SSID), a MAC address of the NAS 120, a Network Access Provider ID (NAPID), a Network Service Provider (NAPID), and the like.

The NAS 120 transmits an EAP Request/Identity message requesting a subscriber ID for network access to the terminal 140 using the detected terminal ID in step 202. In step 204, the terminal 140 transmits an EAP Response/Identity message including its subscriber ID to the NAS 120. For example, the subscriber ID may include a combination of a domain name and an ID, such as 'bob@ISP.com'.

Upon receipt of the subscriber ID, the NAS 120 transmits a RADIUS Access Request message including the subscriber ID, the terminal ID, a Base Station (BS)-ID, the NAS ID, and a Message Integrity Code (MIC) to the authentication server 100 in step 206. The MIC is a code generated based on a security association established between the NAS 120 and the authentication server 100, for use in protecting message integrity.

In step 208, the authentication server 100 performs an EAP authentication procedure for mutual authentication with the terminal 140. The EAP authentication procedure is performed using the subscriber ID and an ID of the authentication server 100 set for the EAP authentication procedure. That is, the authentication server 100 transmits the subscriber ID and the terminal ID included in the RADIUS Access Request message and the ID of the authentication server 100 to the terminal 140, and the terminal 140 transmits the stored subscriber ID, the terminal ID, and the ID of the authentication server 100 to the authentication server 100.

Each of the authentication server 100 and the terminal 140 authenticates the other by determining whether the respective stored ID is identical to the received ID. If the mutual authentication is successful, then each of the authentication server 100 and the terminal 140 generates a Master Session Key (MSK). The MSK is used for encrypting a radio link between the terminal 140 and the NAS 120.

In step 210, the authentication server 100 transmits a RADIUS Access Response message to the NAS 120. The RADIUS Access Response message includes information indicating successful authentication of the terminal 140, the MSK, and the MIC.

Upon receipt of the RADIUS Access Response message, the NAS 120 transmits an EAP Success message to the terminal 140 in step 212. The EAP Success message indicates that authentication of the terminal 140 is successful in the authentication server 100 and thus a security association can be established between the terminal 140 and the NAS 120.

Therefore, upon receipt of the EAP Success message, the terminal 140 establishes a security association with the NAS 120 and conducts communication according to the security association in step 214. Specifically, the terminal 140 and the NAS 120 communicate with each other according to the security association using the MSK generated in step 208 at the terminal 140 and the MSK included in the received RADIUS Access Response message at the NAS 120.

As described above, although a related communication system may provide an authentication procedure, such an authentication procedure can only be performed between a node and a NAS. In other words, in related communication systems, it is impossible to perform an authentication procedure between nodes. Due to the need for secure communication between nodes, a method and system for performing authentication between nodes in the related authentication procedure are provided according to exemplary embodiments of the present invention.

Figure 3:
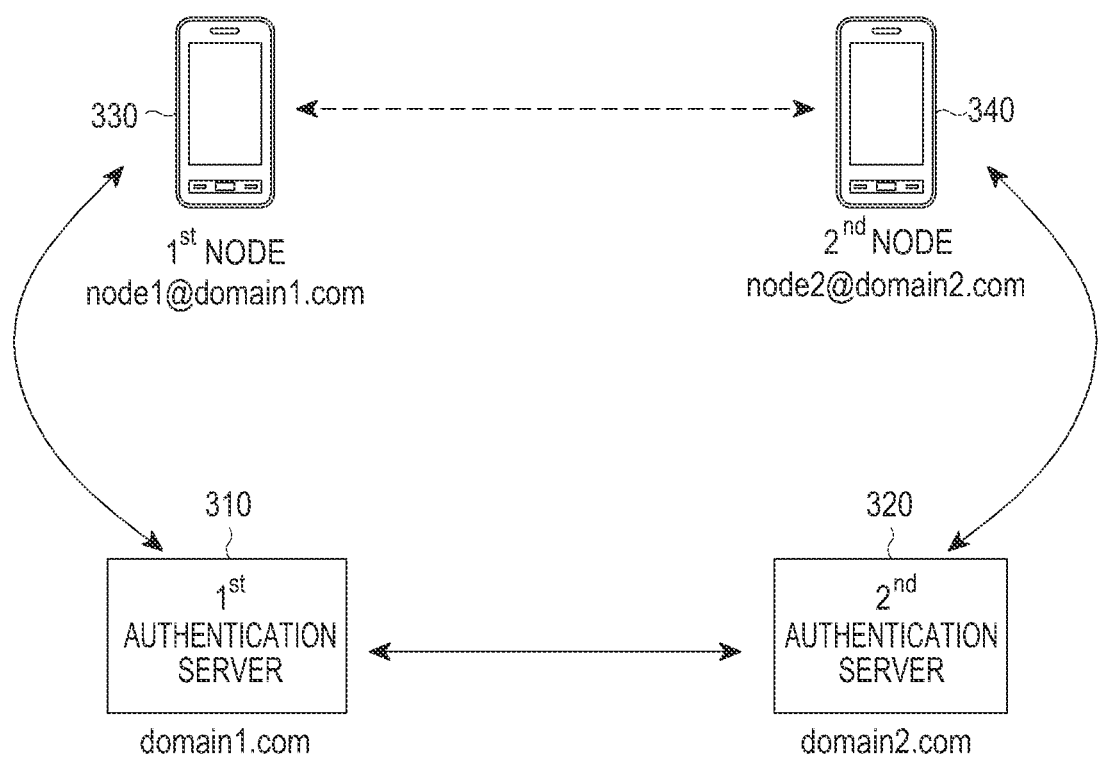
FIG. 3 illustrates a configuration of a communication system according to an exemplary embodiment of the present invention.

With reference to FIG. 3, a configuration of a communication system according to an exemplary embodiment of the present invention will be described below.

FIG. 3 illustrates a configuration of a communication system according to an exemplary embodiment of the present invention.

Referring to FIG. 3, the communication system includes a first authentication server 310, a second authentication server 320, a first node 330, and a second node 340.

The first authentication server 310 has, for example, a domain named 'domain1.com' and stores information required for authenticating nodes each having an ID including the domain name 'domain1.com'. Therefore, the first authentication server 310 stores information related to the first node 330. For example, the first authentication server 310 stores an ID of the first node 330 (hereinafter, referred to as the first node ID) and a shared key generated during an EAP authentication procedure that the first authentication server 310 performs with the first node 330. The first node ID may be, for example, 'node1@domain1.com'. The first authentication server 310 and the first node 330 perform mutual authentication using the shared key.

The second authentication server 320 has, for example, a domain named 'domain2.com' and stores information required for authenticating nodes each having an ID including the domain name 'domain2.com'. Therefore, the second authentication server 320 stores information related to the second node 340. For example, the second authentication server 320 stores an ID of the second node 340 (hereinafter, referred to as the second node ID) and a shared key generated during an EAP authentication procedure that the second authentication server 320 performs with the second node 340. The second node ID may be, for example, 'node2@domain2.com'. The second authentication server 320 and the second node 340 perform mutual authentication using the shared key. The authentication procedure may be performed between the second authentication server 330 and the second node 340 by Protocol for Carrying Authentication for Network Access (PANA), RADIUS, Diameter, any other EAP transmission protocol, and/or the like.

The first and second authentication servers 310 and 320 may perform authentication directly or indirectly. For example, for indirect authentication, an AAA proxy/server or broker connected to both the first and second authentication servers 310 and 320 or an AAA Web-of Trust may be used. An authentication procedure may be performed between the first and second authentication servers 310 and 320 by PANA, RADIUS, Diameter, any other EAP transmission protocol, and/or the like.

It is impossible for the first node 330 registered to the first authentication server 310 and the second node 340 registered to the second authentication server 320 to authenticate each other directly. Therefore, the first and second nodes 330 and 340 should perform authentication through the first and second authentication servers 330 and 340. PANA or any other EAP transmission protocol may be used for authentication between the first and second nodes 330 and 340.

Now a detailed description will be given of an authentication procedure between the first and second nodes 330 and 340 with reference to FIG. 4.

Figure 4:
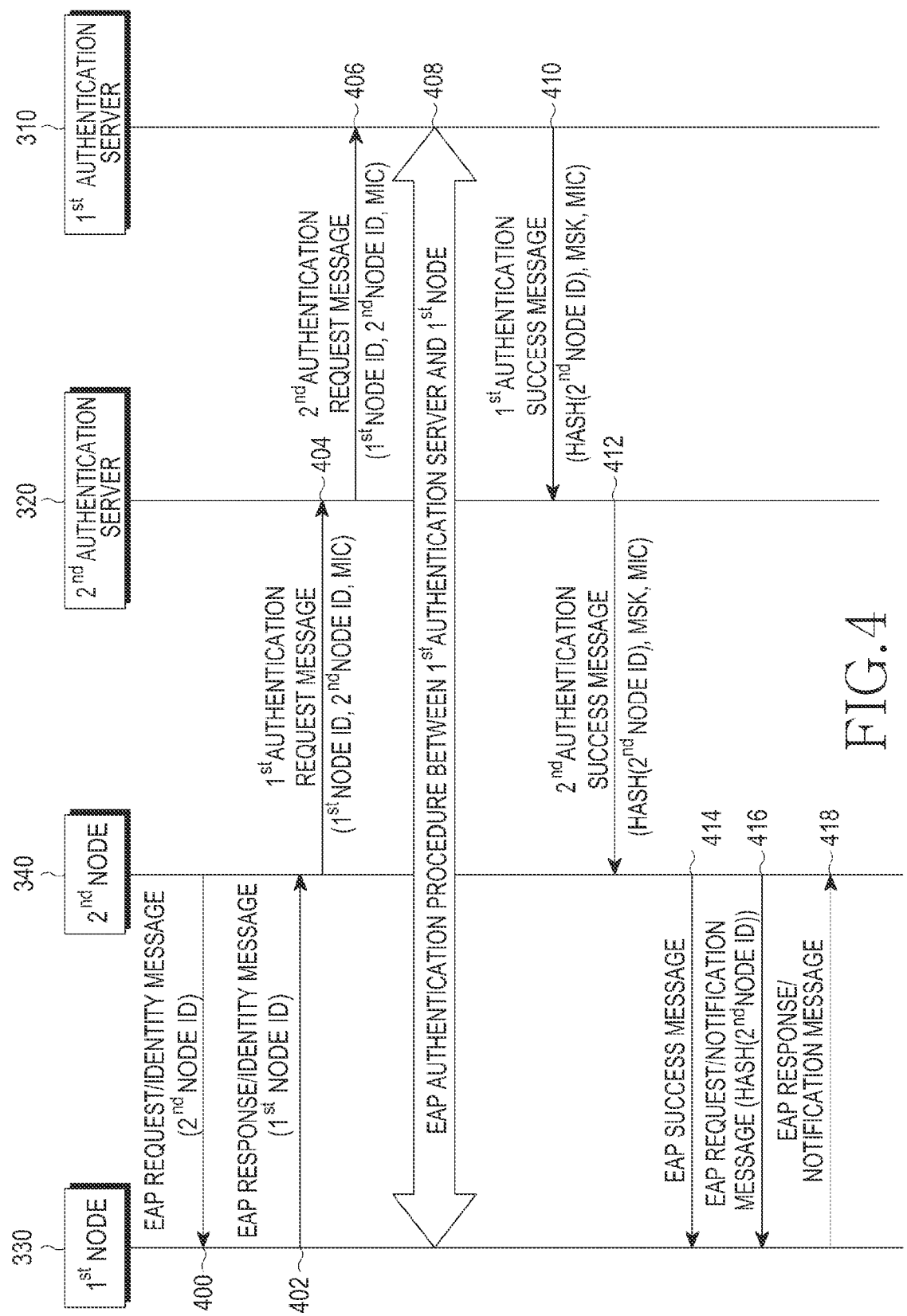
FIG. 4 illustrates a signal flow for an authentication procedure between nodes in a communication system according to an exemplary embodiment of the present invention.

FIG. 4 is a diagram illustrating a signal flow for an authentication procedure between nodes in a communication system according to an exemplary embodiment of the present invention.

Referring to FIG. 4, the second node 340 transmits an EAP Request/Identity message to the first node 330 in step 400. The EAP Request/Identity message may include the second node ID (e.g. node2@domain2.com). If the second node ID has already been transmitted to the first node 330 before step 400, then the EAP Request/Identity message may not include the second node ID.

Upon receipt of the EAP Request/Identity message, the first node 330 transmits an EAP Response/Identity message including the first node ID (e.g. node1@domain1.com) to the second node 340 in step 402. In step 404, the second node 340 transmits a first authentication request message requesting authentication of the first node 330 to the second authentication server 320. The first authentication request message includes the first node ID, the second ID, and an MIC. The MIC may include a Hash value to protect integrity of the first authentication request message.

Upon receipt of the first authentication request message, the second authentication server 320 determines whether the MIC included in the first authentication request message is identical to an MIC set for authentication with the second node 340. If the received MIC is identical to the MIC set for authentication with the second node 340, then the second authentication server 320 determines that the first authentication request message is valid. The second authentication server 320 performs authentication based on the second node ID included in the first authentication request message to determine whether the second node 340 was registered.

If the second node 340 is an authorized node, the second authentication server 320 operates as follows to authenticate the first node 330. The second authentication server 320 detects authentication server identification information from the first node ID included in the first authentication request message. The authentication server identification information refers to information used to detect an authentication server corresponding to the first node ID from among a plurality of authentication servers. The authentication server identification information, so-called realm information, may be, for example, domain information about an authentication server.

Because the first node ID is 'node1@domain1.com' according to an exemplary embodiment of the present invention, the second authentication server 320 detects domain information 'domain1.com' as the authentication server identification information. Then the second authentication server 320 identifies the first authentication server 310 corresponding to the detected domain information 'domain1.com' from among a plurality of authentication servers.

Upon identifying the first authentication server 310, the second authentication server 320 transmits a second authentication request message to the first authentication server 310 in step 406. The second authentication request message relays the first authentication request message to the first authentication server 310, including similar information to the information included in the first authentication request message. That is, similarly to the first authentication request message, the second authentication request message includes the first node ID, the second node ID, and an MIC. However, the MIC included in the second authentication request message is determined to protect the integrity of messages transmitted and received between the first and second authentication servers 310 and 320, and thus the MIC included in the second authentication request message is different from the MIC included in the first authentication request message.

Upon receipt of the second authentication request message, the first authentication server 310 determines whether the MIC included in the second authentication request message is identical to an MIC set for authentication with the second authentication server 320. If the received MIC (i.e., the MIC included in the second authentication request message) is identical to the MIC set for authentication with the second authentication server 320, then the first authentication server 310 performs an EAP authentication procedure with the first node 330 using the first node ID included in the second authentication request message in step 408.

Specifically, the first authentication server 310 transmits the first node ID included in the second authentication request message to the first node 330 and the first node 330 transmits its ID to the first authentication server 310. Then the first authentication server 310 determines whether the first node 330 is an authorized node by comparing the first node ID included in the second authentication request message with the ID received from the first node 330. In addition, the first node 330 determines whether the first authentication server 310 has authenticated the first server 310 by comparing the ID received from the first authentication server 310 with its ID.

If each of the first authentication server 310 and the first node 330 determines that the authentication is successful, then the first authentication server 310 generates and stores an MSK. The MSK is used to establish a security association for encrypted communication between the first and second nodes 330 and 340.

In step 410, the first authentication server 310 transmits a first authentication success message to the second authentication server 320. The first authentication success message includes a Hash value of the second node ID, the MSK, and the MIC. The Hash value of the second node ID may be used for the first node 330 to determine whether the second node 340 is suitable for encrypted communication with the first node 330.

The Hash value of the second node ID may be generated using a secret value shared between the first authentication server 310 and the first node 300. The secret value may include, for example, an Extended Master Session Key (EMSK) based on the EAP or a key derived from the EMSK. Equation 1 is an example of computing the Hash value of the second node ID.

$$\text{Hash(second node ID)} = \text{HMAC-SHA1(second node ID, EMSK)} \quad (1)$$

In Equation 1, HMAC-Secure Hash Algorithm 1 (SHA1) denotes a function of generating the Hash value of the second node ID. According to equation 1, the Hash value of the second node ID is generated by applying the second node ID and the EMSK to HMAC-SHA1, by way of example. According to exemplary embodiments of the present invention, another function may be used to generate the Hash value of the second node ID (i.e., rather than using HMAC-SHA1).

Upon successful receipt of the first authentication success message, the second authentication server 320 transmits a second authentication success message to the second node 340 in step 412. The second authentication success message relays the first authentication success message to the second node 340. The second authentication success message includes similar information to the information included in the first authentication success message. That is, similarly to the first authentication success message, the second authentication success message includes the Hash value of the second node ID, the MSK, and the MIC. However, the MIC included in the second authentication success message is determined to protect the integrity of messages between the second node 340 and the second authentication server 320. The MIC included in the second authentication success message is different from the MIC included in the first authentication success message which protects the integrity of messages between the first authentication server 310 and the second authentication server 320.

Upon successful receipt of the second authentication success message, the second node 340 may determine that the first node 330 is an authorized node based on the information included in the second authentication success message and thus may acquire the MSK for a security association with the first node 330.

In step 414, the second node 340 transmits an EAP Success message to the first node 330. If the second node 340 has already been authenticated by the first authentication server 310, then the second node 340 may not transmit the EAP success message to the first node 330.

Because the EAP Success message cannot include additional payload, it does not include the Hash value of the second node ID. Therefore, the second node 340 transmits an EAP Request/Notification message including the Hash value of the second node ID to the first node 330 in step 416.

The first node 330 calculates a Hash value of the second node ID using the second node ID received in step 400 and the EMSK by Equation 1 and determines whether the received Hash value of the second node ID is equal to the calculated Hash value of the second node ID. Subsequently, the first node 330 transmits an EAP Response/Notification message including the determination result to the second node 340 in step 418.

If the two Hash values are equal, the first and second nodes 330 and 340 establish a security association and communicate based on the security association. For example, the MSK may be used to establish the security association. The first node 330 generates an authentication key using the MSK generated in step 408 and the second node 340 generates an authentication key using the MSK included in the second authentication success message. Then the first and second nodes 330 and 340 conduct encrypted communication using the authentication keys.

While it has been described in the above exemplary embodiment of the present invention that the second node 340 transmits the Hash value of the second node ID to the first node 330, it may be further contemplated as another exemplary embodiment that instead of the second node 340 transmitting the Hash value of the second node ID to the first node 330, the first authentication server 310 transmits the Hash value of the second node ID to the first node 330. In such an exemplary embodiment, the first authentication server 310 transmits the Hash value of the second node ID to the first node 330 after authentication is successful in step 408, and the first and second authentication success messages transmitted in steps 410 and 412 do not include the Hash value of the second node ID.

Although the signal flow proceeds in the order of the first node 330, the second node 340, the second authentication server 320, and the first authentication server 310 in the above exemplary embodiment of the present invention, the signal flow may proceed in the order of the second node 340, the first node 330, the first authentication server 310, and the second authentication server 320 in another exemplary embodiment of the present invention. That is, the operations of the first node 330, the second node 340, the second authentication server 320, and the first authentication server 310 in FIG. 4 are performed respectively by the second node 340, the first node 330, the first authentication server 310, and the second authentication server 320 in another exemplary embodiment of the present invention. In such an exemplary embodiment of the present invention, IDs included in each message transmitted in the procedure of FIG. 4 are correspondingly changed to IDs of the respective nodes and authentication servers.

With reference to FIGS. 5 to 8, exemplary operations of a first node, a second node, a second authentication server, and a first authentication server illustrated in FIG. 4 will be individually described.

An exemplary operation of a first node will first be described below with reference to FIG. 5.

Figure 5:
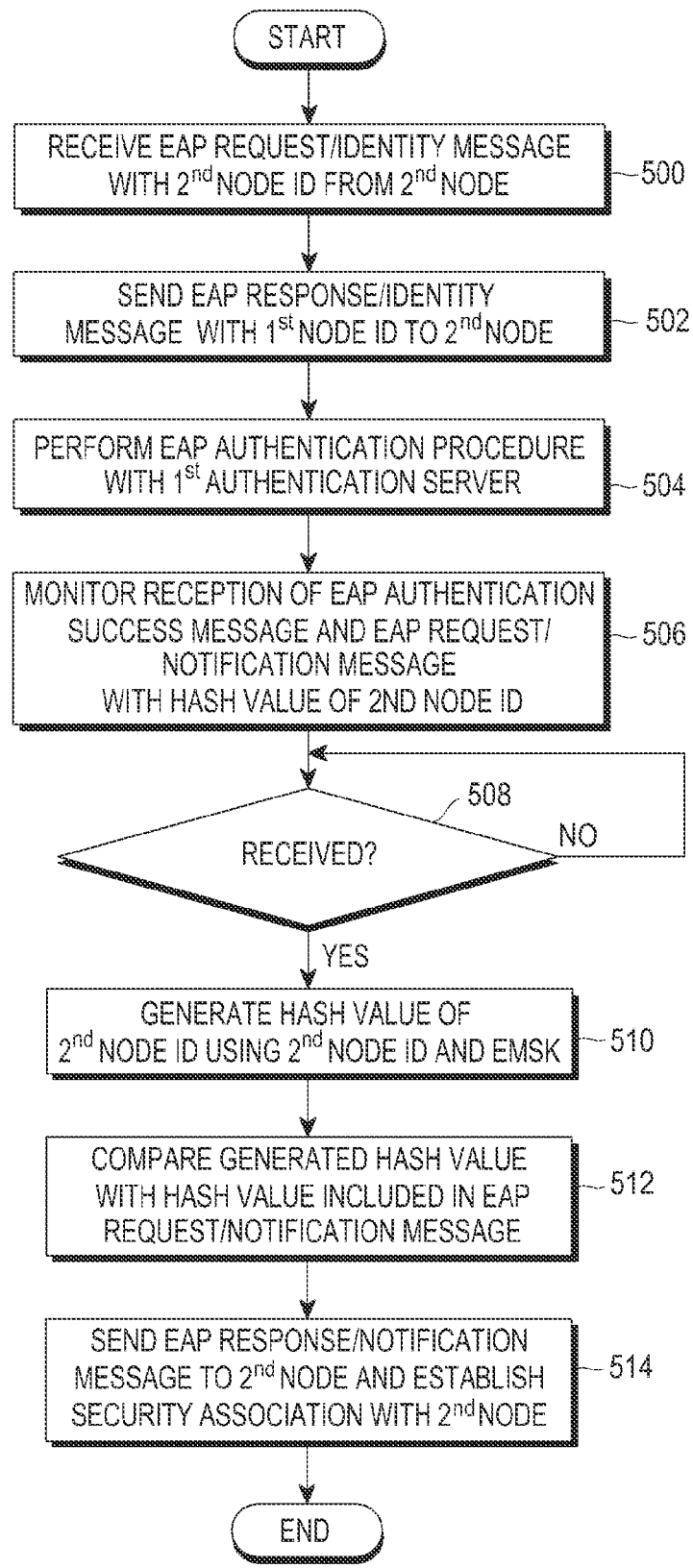
FIG. 5 is a flowchart illustrating an operation for performing authentication with a second node at a first node in a communication system according to an exemplary embodiment of the present invention.

FIG. 5 is a flowchart illustrating an operation for performing authentication with a second node at a first node in a communication system according to an exemplary embodiment of the present invention.

Referring to FIG. 5, the first node 330 receives an EAP Request/Identity message including a second node ID from the second node 340 in step 500.

The EAP Request/Identity message may be configured, for example, in the following format illustrated in Table 1 below.

TABLE 1

| Code=Request | ID =.., | Length=... |
|---|---|---|
| Type = Identity | Data ="Hello! \ 0PeerID=node2@domain2.com" | |

Referring to Table 1, an EAP Request Header includes Code, Id and Length fields and EAP Request Data includes Type and Data fields in the EAP Request/Identity message. The Code field provides information (e.g. Request) indicating that the EAP Request/Identity message is a request message and the ID field includes the ID of the EAP Request/Identity message. The Data field includes data to be transmitted to a node that will receive the EAP Request/Identity message and the ID of the transmitter of the EAP Request/Identity message.

Referring to Table 1, the data to be transmitted from the second node 340 to the first node 330, 'Hello!', a NULL character '\0', and the ID of the second node 340 'PeerID=node2@domain2.com' are set in the Data field, by way of example. The Type field indicates the type of the EAP Request/Identity message, being set to 'Identity' indicating that this message includes ID information in Table 1, for example. The Length specifies the length of the data included in the Data field.

The first node 330 transmits an EAP Response/Identity message including a first node ID to the second node 340 in response to the EAP Request/Identity message in step 502 and performs an EAP authentication procedure with the first authentication server 310 in step 504.

If the authentication with the first authentication server 310 is successful, then the first node 330 generates an MSK for future use in a security association with the second node 340. In step 506, the first node 330 determines whether an EAP Success message and an EAP Request/Notification message including a Hash value of the second node ID have been received. The format of the EAP Request/Notification message may be given as illustrated in Table 2 below.

TABLE 2

| Code=Request | ID =.., | Length=... |
|---|---|---|
| Type = Notification | Data ="Hello! \0Hash=3AB4040AF334EF319912" | |

Referring to Table 2, an EAP Request Header includes Code, ID and Length fields, and EAP Request Data includes Type and Data fields in the EAP Request/Notification message. The Code field provides information (e.g. Request) indicating that the EAP Request/Notification message is a request message and the ID field includes the ID of the EAP Request/Notification message. The Data field includes data to be transmitted to a node that will receive the EAP Request/Notification message and a Hash value of the ID of the transmitter of the EAP Request/Notification message.

Referring to Table 2, the data to be transmitted from the second node 340 to the first node 330, 'Hello!', a NULL character '\0', and the Hash value of the second node ID 'Hash=3AB4040AF334EF319912' are set in the Data field, by way of example. The Type field indicates the type of the EAP Request/Notification message. For example, as provided in Table 2, the Type field is set to 'Notification' indicating that this message is a notification message. The Length specifies the length of the data included in the Data field.

Meanwhile, upon receipt of the EAP Success message and the EAP Request/Notification message in step 508, the first node 330 generates a Hash value of the second node ID using the second node ID and an EMSK in step 510 and compares the generated Hash value of the second node ID with the Hash value of the second node ID included in the EAP Request/Notification message in step 512.

In step 514, the first node 330 transmits an EAP Response/Notification message to the second node 340 according to the comparison result and establishes a security association with the second node 340. That is, if the generated Hash value of the second node ID is equal to the Hash value of the second node ID included in the EAP Request/Notification message, then the first node 330 transmits the EAP Response/Notification message to the second node 340. Then the first node 330 establishes a security association with the second node 340 using the MSK generated in step 504 and conducts encrypted communication with the second node 340 according to the security association.

Now a description will be given of an exemplary operation of a second node with reference to FIG. 6.

Figure 6:
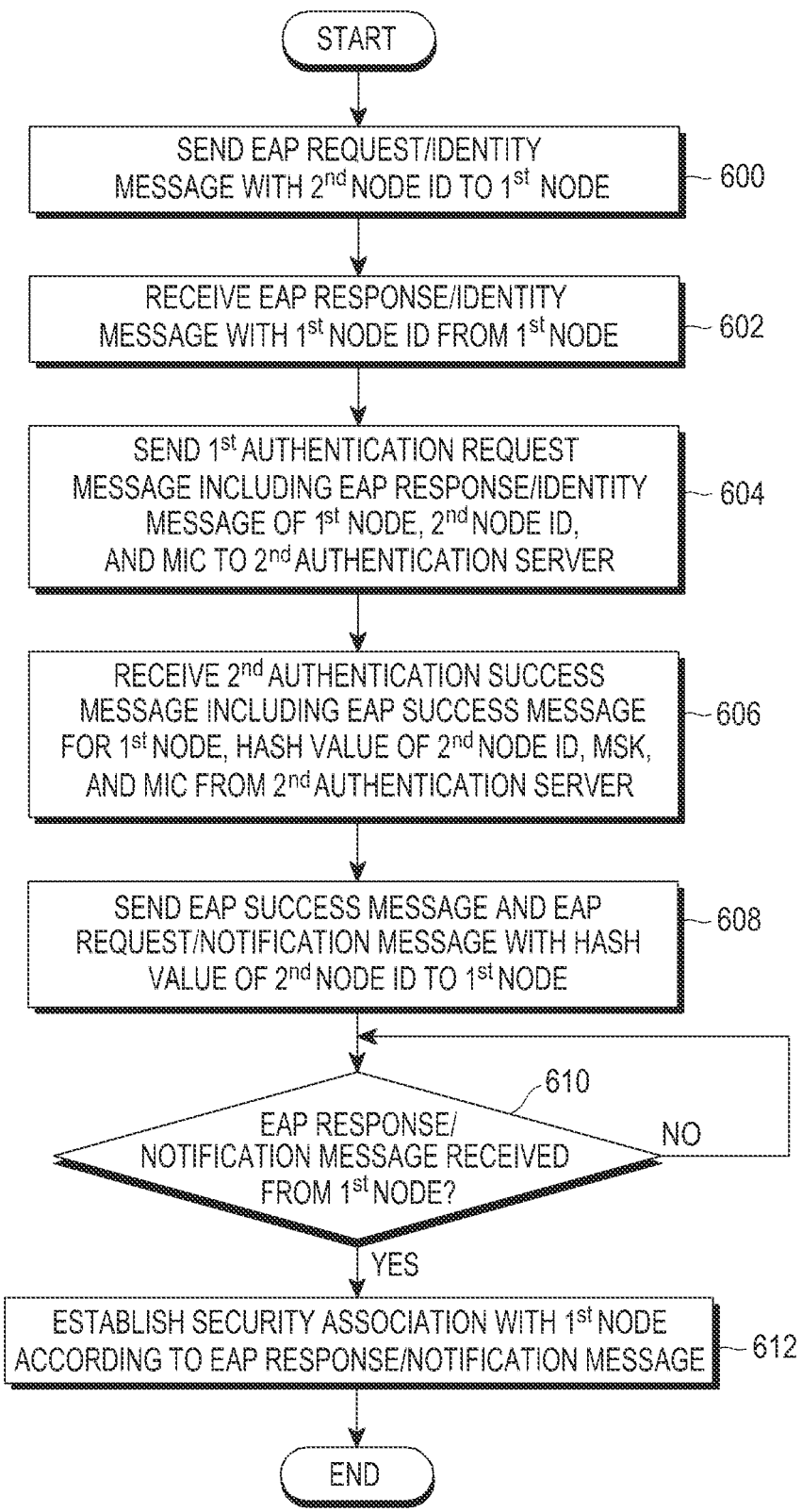
FIG. 6 is a flowchart illustrating an operation for performing authentication with a first node at a second node in a communication system according to an exemplary embodiment of the present invention.

FIG. 6 is a flowchart illustrating an operation for performing authentication with a first node at a second node in a communication system according to an exemplary embodiment of the present invention.

Referring to FIG. 6, the second node 340 transmits an EAP Request/Identity message including a second node ID to the first node 330 in step 600 and receives an EAP Response/Identity message from the first node 330 in step 602.

In step 604, the second node 340 transmits a first authentication request message including the EAP Response/Identity message of the first node 330, the second node ID, and an MIC to the second authentication server 320. The second node 340 requests authentication to the second authentication server 320 by the first authentication request message.

For example, the first authentication request message may have the following format illustrated in Table 3 below.

TABLE 3

| Reserved | Message Length | |
|---|---|---|
| Flags | Message Type | PANA header |
| Session Identifier | | |
| Sequence Number | | |
| AVP Code | AVP Flags | AVP header for EAP payload |
| AVP Length | Reserved | EAP response header |
| Code | Identifier | Length |
| Type | Data = <value of node-1-ID> | EAP response data |
| AVP Code | AVP Flags | AVP header for N2ID |
| AVP Length | Reserved | |
| Data = <value of node-2-ID> | | N2ID data |
| AVP Code | AVP Flags | AVP header for MIC |
| AVP Length | Reserved | |
| Data = <value message authentication code> | | N2ID data |

Referring to Table 3, the first authentication request message includes a PANA header, an Attribute Value Pairs (AVP) header for EAP payload, an EAP response header, EAP response data, an AVP header for N2ID, two N2ID data, and an AVP header for MIC.

For example, the PANA header includes a Message Length field indicating the length of the first authentication request message, a Flags field, a Message Type field indicating the type of the first authentication request message, a Session Identifier field, and a Sequence Number field.

As an example, the AVP header for EAP payload includes an AVP Code field, an AVP Flags field, and an AVP Length field.

As an example, the EAP response header includes Code, Identifier, and Length fields. The EAP response data includes a Type field and a Data field including the first node ID.

As an example, the AVP header for N2ID includes AVP Code, AVP Flags, and AVP Length fields.

As an example, the upper N2ID data includes a Data field including the second node ID. The lower N2ID data includes a Data field including an MIC.

Meanwhile, the second node 340 receives from the second authentication server 320 a second authentication success message including an EAP Success message for the first node 330, a Hash value of the second node ID, an MSK, and an MIC in step 606. Upon receipt of the second authentication success message, the second node 340 is aware of success of authentication at the second authentication server 320. Then the second node 340 may acquire authentication information for a security association with the first node 330, that is, the Hash value of the second node ID and the MSK from the second authentication success message.

The second authentication success message may be configured in the following format illustrated in Table 4 below, for example.

TABLE 4

| Reserved | Message Length | |
|---|---|---|
| Flags | Message Type | PANA header |
| Session Identifier | | |
| Sequence Number | | |
| AVP Code | AVP Flags | AVP header for EAP payload |
| AVP Length | Reserved | |
| Code | Identifier | Length | EAP success header |
| AVP Code | AVP Flags | AVP header for MSK |
| AVP Length | Reserved | |
| Data = <MSK for node-1> | | MSK data |
| AVP Code | AVP Flags | AVP header for Hash(node 2ID) |
| AVP Length | Reserved | |
| Data = <Hashed value of node-2 ID> | | Hash(node2ID) data |
| AVP Code | AVP Flags | AVP header for MIC |
| AVP Length | Reserved | |
| Data = <value message authentication code> | | AAA server 2 data |

Referring to Table 4, the second authentication success message includes a PANA header, an AVP header for EAP payload, an EAP success header, an AVP header for MSK, MSK data, an AVP header for Hash(node 2ID), and Hash (node 2ID) data, an AVP header for MIC, and AAA server 2 data.

For example, the PANA header includes a Message Length field indicating the length of the second authentication success message, a Flags field, a Message Type field indicating the type of the second authentication success message, a Session Identifier field, and a Sequence Number field.

As an example, the AVP header for EAP payload includes an AVP Code field, an AVP Flags field, and an AVP Length field.

As an example, the EAP success header includes Code, Identifier, and Length fields.

As an example, the AVP header for MSK includes AVP Code, AVP Flags, and AVP Length fields.

As an example, the MSK data includes an MSK for encrypted communication with the first node 330.

As an example, the AVP header for Hash(node2 ID) includes AVP Code, AVP Flags, and AVP Length fields.

As an example, the Hash(node2 ID) data field includes information for authenticating the second node 340, that is, Hash(node2 ID) generated based on an EMSK of the first node 330.

As an example, the AVP header for MIC includes AVP Code, AVP Flags, and AVP Length fields.

The AAA server 2 data includes data to be transmitted to the second authentication server 320, including an MIC.

In step 608, the second node 340 transmits the EAP Success message and an EAP Request/Notification message including the Hash value of the second node ID to the first node 330. The second node 340 then monitors reception of an EAP Response/Notification message from the first node 330 in step 610

In step 12, upon receipt of the EAP Response/Notification message, the second node 340 establishes a security association with the first node 330, determining completed authentication with the first node 330. The second node 340 then conducts encrypted communication with the first node 330 using the MSK included in the second authentication success message.

Figure 7:
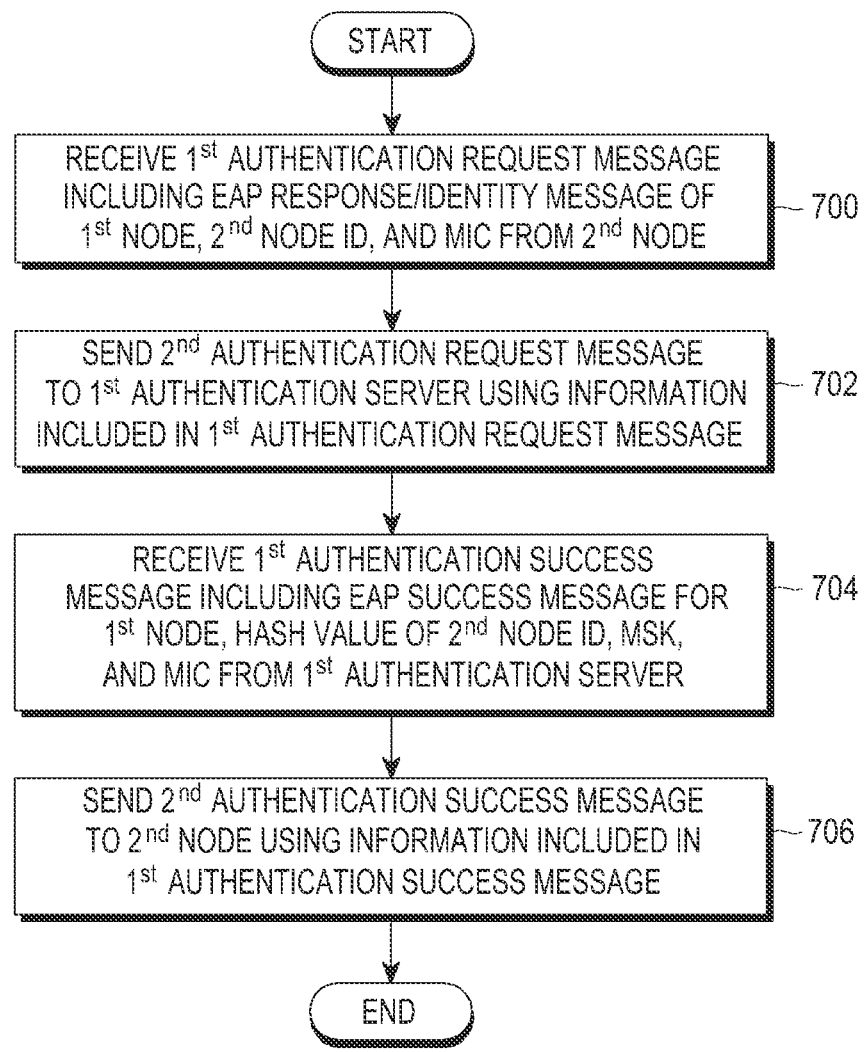
FIG. 7 is a flowchart illustrating an operation for performing authentication for encrypted communication between a first node and a second node at a second authentication server in a communication system according to an exemplary embodiment of the present invention.

With reference to FIG. 7, an exemplary operation of the second authentication server 320 will be described below.

FIG. 7 is a flowchart illustrating an operation for performing authentication for encrypted communication between a first node and a second node at a second authentication server in a communication system according to an exemplary embodiment of the present invention.

Referring to FIG. 7, the second authentication server 320 receives from the second node 340 a first authentication request message including an EAP Response/Identity message of the first node 330, a second node ID, and an MIC in step 700.

The second authentication server 320 detects authentication server identification information (e.g. domain information) from a first node ID included in the first authentication request message and identifies an authentication server corresponding to the detected authentication server identification information from among a plurality of authentication servers. According to the exemplary embodiment of the present invention illustrated in FIG. 7, the second authentication server 320 detects information about a domain managed by the first authentication server 310, 'domain1.com' from the first node ID and thus identifies the first authentication server 310.

Upon identifying the first authentication server 310, the second authentication server 320 transmits a second authentication request message to the first authentication server 310 using information included in the first authentication request message in step 702. The second authentication request message is used to relay the first authentication request message to the first authentication server 310, including the first node ID, the second node ID, and an MIC similar to the information included in the first authentication request message. The second authentication request message is configured in a similar format to the format of the first authentication request message illustrated in Table 3. For example, the second authentication request message may be the same as the first authentication request message in format except that the second authentication request message includes a different MIC from the MIC included in the N2ID data field at the lowest of Table 3.

In step 704, the second authentication server 320 receives a first authentication success message including an EAP Success message for the first node 330, a Hash value of the second node ID, an MSK, and an MIC from the first authentication server 310 in step 704. The first authentication success message is configured in a similar format to the format of the second authentication success message illustrated in Table 4. For example, the first authentication success message may be the same as the second authentication success message in format except that the first authentication success message includes a different MIC from the MIC included in the AAA server2 data field at the lowest of Table 4.

In step 706, the second authentication server 320 transmits a second authentication success message to the second node 340 using the information included in the first authentication success message. The second authentication success message is used to relay the first authentication success message to the second node 340, including the same information as included in the first authentication success message except for an MIC.

Figure 8:
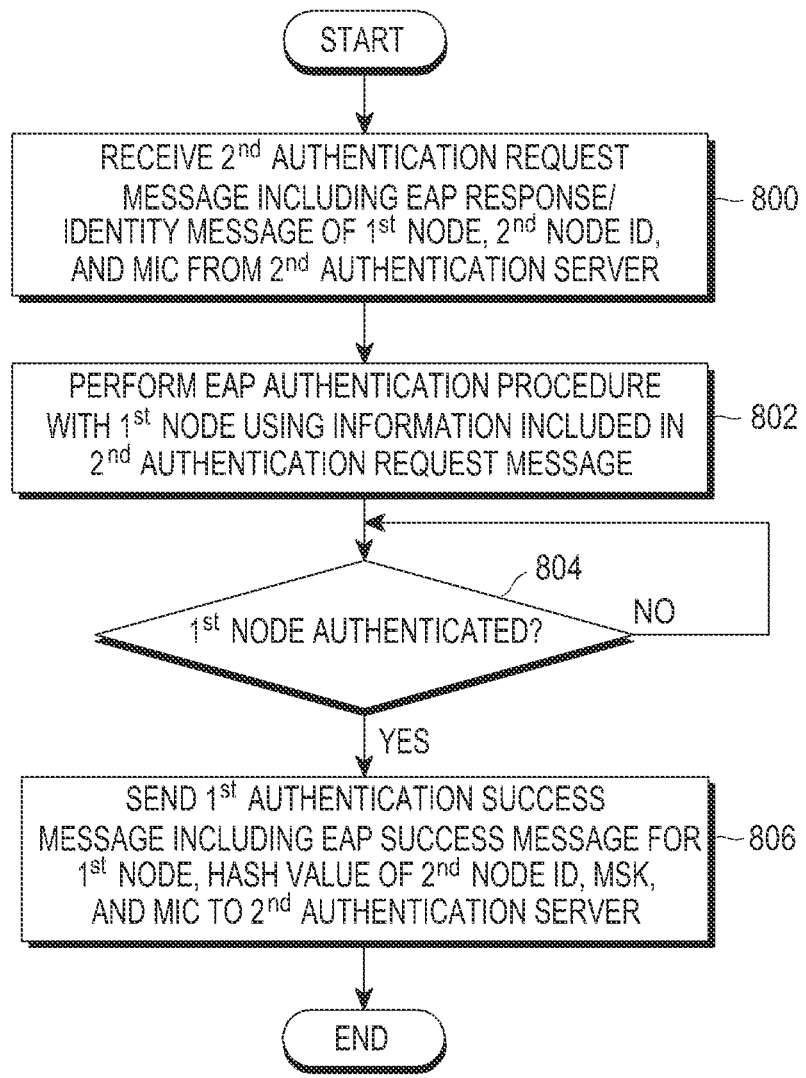
FIG. 8 is a flowchart illustrating an operation for performing authentication for encrypted communication between a first node and a second node at a first authentication server in a communication system according to an exemplary embodiment of the present invention.

With reference to FIG. 8, an exemplary operation of a first authentication server will be described below.

FIG. 8 is a flowchart illustrating an operation for performing authentication for encrypted communication between a first node and a second node at a first authentication server in a communication system according to an exemplary embodiment of the present invention.

Referring to FIG. 8, the first authentication server 310 receives a second authentication request message including an EAP Response/Identity message of the first node 330, a second node ID, and an MIC from the second authentication server 320 in step 800. In step 802, the first authentication server 310 performs an EAP authentication procedure with the first node 330 using the information included in the second authentication request message.

If the first node 330 is authenticated in the EAP authentication procedure, then the first authentication server 310 generates an MSK and calculates a Hash value of the second node ID in step 804. In step 806, the first authentication server 310 transmits a first authentication success message including an EAP Success message for the first node 330, the Hash value of the second node ID, the MSK, and an MIC to the second authentication server 320.

Configurations of a first node, a second node, a second authentication server 320, and a first authentication server, according to exemplary embodiments of the present invention, will be described with reference to FIGS. 9 to 12.

An exemplary configuration of the first node 330 will first be described with reference to FIG. 9.

Figure 9:
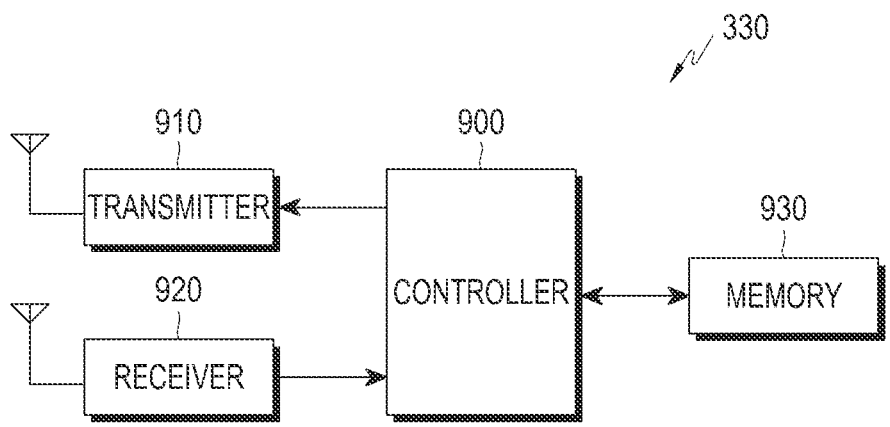
FIG. 9 is a block diagram of a first node according to an exemplary embodiment of the present invention.

FIG. 9 is a block diagram of a first node according to an exemplary embodiment of the present invention.

Referring to FIG. 9, the first node 330 includes a transmitter 910, a receiver 920, a memory 930, and a controller 900.

The transmitter 910 and the receiver 920 perform a wireless communication function of the first node 330. For example, the transmitter 910 transmits an EAP Response/Identity message and an EAP Response/Notification message to the second node 340, and transmits EAP-based messages to the first authentication server 310, for authentication with the first authentication server 310.

As an example, the receiver 920 receives an EAP Request/Identity message, an EAP Success message, and an EAP Request/Notification message from the second node 340, and receives EAP-based messages from the first authentication server 310, for authentication with the first authentication server 310.

The memory 930 is configured to store information. For example, the memory 930 stores a first node ID, an MSK generated in the authentication procedure with the first authentication server 310, a second node ID included in the EAP Request/Identity message, an EMSK used to generate a Hash value of the second node ID, and a Hash value of the second node ID included in the EAP Request/Notification message.

The controller 900 provides overall control to the first node 330. In particular, the controller 900 operatively controls the transmitter 910, the receiver 920, and the memory 930. Specifically, upon receipt of the EAP Request/Identity message including the second node ID, the controller 900 transmits the EAP Response/Identity message including the first node ID to the second node 340 through the transmitter 910.

According to exemplary embodiments of the present invention, the controller 900 performs the EAP authentication procedure with the first authentication server 310. If the authentication with the first authentication server 310 is successful, then the controller 900 generates the MSK for use in a security association with the second node 340 and stores the generated MSK in the memory 930.

Upon receipt of the EAP Success message and the EAP Request/Notification message including the Hash value of the second node ID, the controller 900 generates a Hash value of the second node using the stored second node ID and EMSK. Subsequently, the controller 900 compares the generated Hash value of the second node ID with the Hash value of the second node ID included in the EAP Request/Notification message. If the two Hash values of the second node ID are equal, then the controller 900 transmits the EAP Response/Notification message to the second node 340 through the transmitter 910.

The controller 900 establishes a security association with the second node 340 using the MSK and conducts encrypted communication with the second node 340 according to the established security association.

Figure 10:
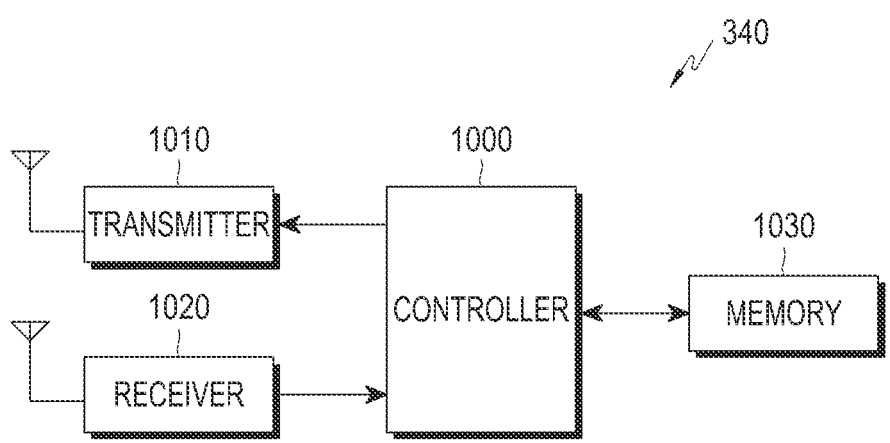
FIG. 10 is a block diagram of a second node according to an exemplary embodiment of the present invention.

With reference to FIG. 10, an exemplary configuration of a second node will be described.

FIG. 10 is a block diagram of a second node according to an exemplary embodiment of the present invention.

Referring to FIG. 10, the second node 340 includes a transmitter 1010, a receiver 1020, a memory 1030, and a controller 1000.

The transmitter 1010 and the receiver 1020 perform a wireless communication function of the second node 340. For example, the transmitter 1010 transmits an EAP Request/Identity message including a second node ID, an EAP success message, and an EAP Request/Notification message to the first node 330. The transmitter 1010 also transmits a first authentication request message to the second authentication server 320.

As an example, the receiver 1020 receives an EAP Response/Identity message and an EAP Response/Notification message from the first node 330 and receives a second authentication success message from the second authentication server 320.

The memory 1030 is configured to store information. For example, the memory 1030 stores a first node ID included in the EAP Response/Identity message, an MIC set for transmitting and receiving encrypted messages to and from the second authentication server 320, and a Hash value of the second node ID and an MSK included in the second authentication success message.

The controller 1000 provides overall control to the second node 340. In particular, the controller 1000 operatively controls the transmitter 1010, the receiver 1020, and the memory 1030. Specifically, the controller 1000 transmits the EAP Request/Identity message including the second node ID to the first node 330 and receives the EAP Response/Identity message including the first node ID from the first node 330.

In addition, the controller 1000 transmits the first authentication request message including the EAP Response/Identity message received from the first node 330, the second node ID, and the MIC to the second authentication server 320. Upon receipt of the second authentication success message including the EAP Success message for the first node 330, the Hash value of the second node, the MSK, and the MIC from the second authentication server 320, the controller 1000 transmits the EAP Success message and the EAP Request/Notification message including the Hash value of the second node ID to the first node 330.

Upon receipt of the EAP Response/Notification message from the first node 330, the controller 1000 establishes a security association with the first node 330, and determines that the authentication with the first node 330 has been completed. Then the controller 1000 conducts encrypted communication with the first node 330 using the MSK included in the second authentication success message.

Figure 11:
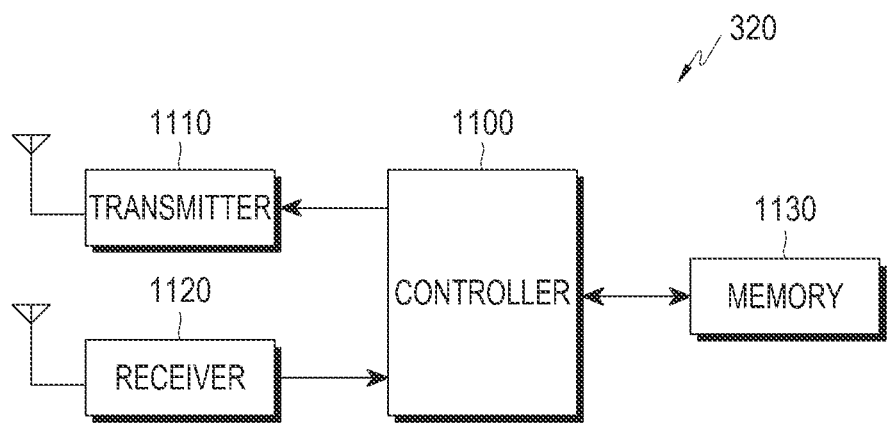
FIG. 11 is a block diagram of a second authentication server according to an exemplary embodiment of the present invention.

With reference to FIG. 11, an exemplary configuration of a second authentication server will be described.

FIG. 11 is a block diagram of a second authentication server according to an exemplary embodiment of the present invention.

Referring to FIG. 11, the second authentication server 320 includes a transmitter 1110, a receiver 1120, a memory 1130, and a controller 1100.

The transmitter 1110 and the receiver 1120 perform a wireless communication function of the second authentication server 320. For example, the transmitter 1010 transmits a second authentication request message to the first authentication server 310, and transmits a second authentication success message to the second node 340.

As an example, the receiver 1120 receives a first authentication request message from the second node 340, and receives a first authentication success message from the first authentication server 310.

The memory 1130 stores a first node ID, a second node ID, and an MIC set for transmission and reception of encrypted messages to and from the second node 340, which are included in the first authentication request message, an MIC set for transmission and reception of encrypted messages to and from the first authentication server 310, and a Hash value of the second node ID and an MSK included in the first authentication success message.

The controller 1100 provides overall control of the second authentication server 320. In particular, the controller operatively controls the transmitter 1110, the receiver 1120, and the memory 1130. Specifically, upon receipt of the first authentication request message including an EAP Response/Identity message of the first node 330, the second node ID, and the MIC from the second node 340, the controller 1100 detects authentication server identification information from the first node ID included in the first authentication request message and identifies an authentication server corresponding to the detected authentication server identification information from among a plurality of authentication servers.

If the identified authentication server is the first authentication server 310, then the controller 1100 transmits the second authentication request message to the first authentication server 310. The second authentication request message is used to relay the first authentication request message to the first authentication server 310, including the same information included in the first authentication request message except for the MIC.

Upon receipt of the first authentication success message including an EAP Success message for the first node 330, the Hash value of the second node ID, the MSK, and the MIC from the first authentication server 310, the controller 1100 transmits the second authentication success message to the second node 340. The second authentication success message is used to relay the first authentication success message to the second node 340, including the same information as included in the first authentication success message except for the MIC.

Figure 12:
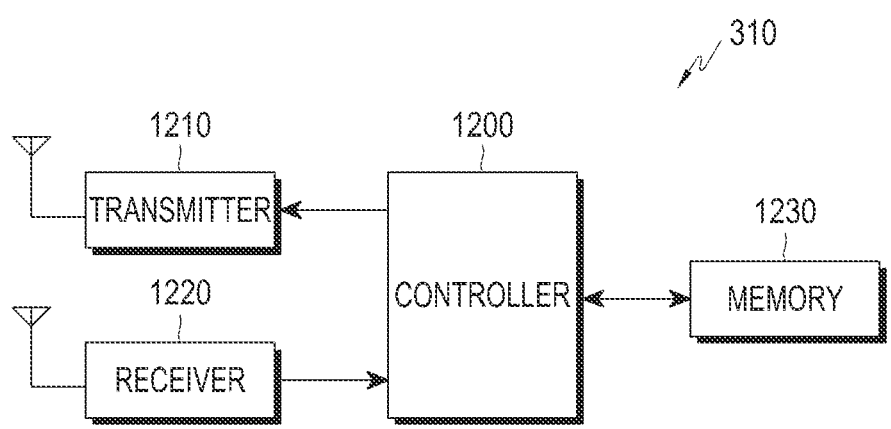
FIG. 12 is a block diagram of a first authentication server according to an exemplary embodiment of the present invention.

With reference to FIG. 12, an exemplary configuration of a first authentication server will be described.

FIG. 12 is a block diagram of a first authentication server according to an exemplary embodiment of the present invention.

Referring to FIG. 12, the first authentication server 310 includes a transmitter 1210, a receiver 1220, a memory 1230, and a controller 1200.

The transmitter 1210 and the receiver 1220 perform a wireless communication function of the first authentication server 310. For example, the transmitter 1210 transmits EAP-based messages for authentication with the first node 330 to the first node 330 and transmits a first authentication success message to the second authentication server 320. The receiver 1220 receives a second authentication request message from the second authentication server 320.

The memory 1230 is configured to store information. For example, the memory 1230 stores a first node ID, a second node ID, and an MIC set for transmission and reception of encrypted messages to and from the second authentication server 320, which are included in the second authentication request message, a Hash value of the second node ID, and an MSK generated in the authentication procedure with the first node 330.

The controller 1200 provides overall control of the first authentication server 310, In particular, the controller 1200 operatively controls the transmitter 1210, the receiver 1220, and the memory 1230. Specifically, upon receipt of the second authentication request message including an EAP Response/Identity message of the first node 330, the second node ID, and the MIC from the second authentication server 320, the controller 1200 performs an EAP authentication procedure with the first node 330 using the information included in the second authentication request message.

If the first node 330 is authenticated, then the controller 1200 generates the MSK and the Hash value of the second node ID. Then the controller 1200 transmits the first authentication success message including an EAP Success message for the first node 330, the Hash value of the second node ID, the MSK, and the MIC to the second authentication server 320.

As is apparent from the above description, because exemplary embodiments of the present invention enable authentication between nodes in a communication system, the authenticated nodes can conduct encrypted communication with each other. According to exemplary embodiments of the present invention, nodes may be an Internet Protocol Television (IPTV), a portable terminal, a laptop, a vehicle, and/or the like. Furthermore, because encrypted communication may be conducted between various nodes such, information can be transmitted and received with security.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. In a communication system comprising a first node registered to a first authentication server and a second node registered to a second authentication server, a method for authenticating the first node by the first authentication server, the method comprising:
receiving an authentication request message requesting authentication of the first node from the second authentication server;
authenticating the first node using an identifier (ID) of the first node comprised in the authentication request message by conducting an authentication procedure between the first node and the first authentication server;
generating a hash value of an ID of the second node based on the ID of the second node and a secret value between the first authentication server and the first node if the authentication of the first node is successful;
generating a security key for use in encrypted communication between the first node and the second node; and
transmitting an authentication success message indicating successful authentication of the first node to the second authentication server,
wherein the authentication request message comprises the ID of the first node, the ID of the second node, and a first authentication code, and
wherein the authentication success message comprises the hash value of the ID of the second node used by the first node for determining to perform of communication with the second node, the security key, and a second authentication code.

2. The method of claim 1,
wherein the first authentication code comprises a first message integrity code (MIC) to protect integrity of the authentication request message,
wherein the second authentication code comprises a second MIC to protect integrity of the authentication success message, and
wherein the security key comprises a master session key (MSK).

3. In a communication system comprising a first node registered to a first authentication server and a second node registered to a second authentication server, a method for performing encrypted communication with the second node by the first node, the method comprising:
transmitting a response identity message comprising an identifier (ID) of the first node to the second node, when a request identity message comprising an ID of the second node is received from the second node;
performing an authentication procedure with the first authentication server using the ID of the first node;
receiving a security key for use in encrypted communication between the first node and the second node;
generating a hash value of the ID of the second node based on a secret value between the first authentication server and the first node, and the ID of the second node;
determining a hash value of the ID of the second node using the ID of the second node, when an authentication success message indicating successful authentication of the first node and a connection request message comprising a hash value of the ID of the second node are received from the second node; and
transmitting a connection response message indicating that encrypted communication is possible to the second node and performing the encrypted communication with the second node, if the determined hash value is equal to the hash value comprised in the connection request message.

4. The method of claim 3,
wherein the performing of the encrypted communication comprises performing the encrypted communication with the second node using the security key, and
wherein the security key comprises a master session key (MSK).

5. In a communication system comprising a first node registered to a first authentication server and a second node registered to a second authentication server, the first authentication server for authenticating the first node, the first authentication server comprising:
a receiver configured to receive an authentication request message requesting authentication of the first node from the second authentication server;
a transmitter configured to transmit an authentication success message indicating successful authentication of the first node to the second authentication server; and
a controller configured to:
control the transmitter and the receiver, to operatively receive the authentication request message from the second authentication server,
authenticate the first node using an identifier (ID) of the first node comprised in the authentication request message by conducting an authentication procedure between the first node and the first authentication server,
generate a hash value of an ID of the second node based on the ID of the second node and a secret value between the first authentication server and the first node if the authentication of the first node is successful,
generate a security key for use in encrypted communication between the first node and the second node, and
operatively transmit the authentication success message to the second authentication server,
wherein the authentication request message comprises the ID of the first node, the ID of the second node, and a first authentication code, and
wherein the authentication success message comprises the hash value of the ID of the second node used by the first node for determining to perform of communication with the second node, the security key, and a second authentication code.

6. The first authentication server of claim 5,
wherein the first authentication code comprises a first message integrity code (MIC) to protect integrity of the authentication request message,
wherein the second authentication code comprises a second MIC to protect integrity of the authentication success message, and
wherein the security key comprises a master session key (MSK).

7. In a communication system comprising a first node registered to a first authentication server and a second node registered to a second authentication server, the first node for performing encrypted communication with the second node, the first node comprising:
a receiver configured to receive a request identity message comprising an identifier (ID) of the second node, an authentication success message indicating successful authentication of the first node, and a connection request message comprising a hash value of the ID of the second node from the second node;
a transmitter configured to transmit a response identity message comprising an ID of the first node and a connection response message indicating that encrypted communication is possible to the second node; and
a controller configured to:
control the receiver and the transmitter,
operatively transmit the response identity message to the second node, when the request identity message is received from the second node,
perform an authentication procedure with the first authentication server using the ID of the first node,
receive a security key for use in encrypted communication between the first node and the second node,
generate a hash value of the ID of the second node based on a secret value between the first authentication server and the first node, and the ID of the second node,
determine a hash value of the ID of the second node using the ID of the second node, when the authentication success message and the connection request message are received from the second node,
compare the determined hash value with the hash value comprised in the connection request message,
operatively transmit the connection response message to the second node, if the determined hash value is equal to the hash value comprised in the connection request message, and
operatively perform the encrypted communication with the second node.

8. The first node of claim 7,
wherein the controller is further configured to operatively perform the encrypted communication with the second node using the security key, and
wherein the security key comprises a master session key (MSK).

* * * * *